United States Patent
Maruyama

(10) Patent No.: US 9,650,250 B2
(45) Date of Patent: May 16, 2017

(54) METHOD FOR PRODUCING BIS(HALOSULFONYL)AMINE

(71) Applicant: NIPPON SODA CO., LTD., Tokyo (JP)

(72) Inventor: Michiaki Maruyama, Myoko (JP)

(73) Assignee: NIPPON SODA CO., LTD., Tokyo (JP)

( * ) Notice: Subject to any disclaimer, the term of this patent is extended or adjusted under 35 U.S.C. 154(b) by 239 days.

(21) Appl. No.: 14/416,495

(22) PCT Filed: Jul. 24, 2013

(86) PCT No.: PCT/JP2013/070029
§ 371 (c)(1),
(2) Date: Jan. 22, 2015

(87) PCT Pub. No.: WO2014/024682
PCT Pub. Date: Feb. 13, 2014

(65) Prior Publication Data
US 2015/0175422 A1    Jun. 25, 2015

(30) Foreign Application Priority Data
Aug. 6, 2012   (JP) .................................. 2012-174209

(51) Int. Cl.
*C01B 21/086*    (2006.01)
*C01B 21/093*    (2006.01)
*H01M 10/0568*   (2010.01)
*H01M 10/0567*   (2010.01)

(52) U.S. Cl.
CPC .......... *C01B 21/086* (2013.01); *C01B 21/093* (2013.01); *H01M 10/0567* (2013.01); *H01M 10/0568* (2013.01)

(58) Field of Classification Search
None
See application file for complete search history.

(56) References Cited

U.S. PATENT DOCUMENTS

| | | | |
|---|---|---|---|
| 5,916,475 A | 6/1999 | Michot et al. | |
| 7,468,174 B2 | 12/2008 | Sugawara et al. | |
| 2004/0097757 A1 | 5/2004 | Cernik et al. | |
| 2011/0034716 A1 | 2/2011 | Okumura et al. | |
| 2012/0041233 A1 | 2/2012 | Sato et al. | |
| 2013/0066110 A1 | 3/2013 | Honda et al. | |

FOREIGN PATENT DOCUMENTS

| | | |
|---|---|---|
| CN | 101980955 A | 2/2011 |
| CN | 102405189 A | 4/2012 |
| JP | H08-217745 A | 8/1996 |
| JP | H08-511274 A | 11/1996 |
| JP | 2003-137850 A | 5/2003 |
| JP | 2004-522681 A | 7/2004 |
| JP | 2010-121114 A | 6/2010 |
| JP | 2010-168249 A | 8/2010 |
| JP | 2010-189372 A | 9/2010 |
| JP | 2013-087019 A | 5/2013 |
| WO | 2010/010613 A1 | 1/2010 |
| WO | 2011/148958 A1 | 12/2011 |
| WO | 2012/160280 A2 | 11/2012 |
| WO | 2013/058069 * | 4/2013 |

OTHER PUBLICATIONS

Krumm B et al., "Synthesis of Poly- and the First Perfluoroalkyl-N(SO2F)2 Derivatives: Improved Methods for the Preparation of XN(SO2F)2 (X=H CL) and Single-Crystal Diffraction Studies of HN(SO2CL)2, HN(SO2F)2, and CF3CH2N(SO2F)2", Inorganic Chemistry, American Chemical Society, Easton, US, vol. 37, Jan. 1, 1998 (Jan. 1, 1998), pp. 6295-6303, XP000926421, ISSN: 0020-1669.
Apr. 15, 2016 Office Action issued in Chinese Patent Application No. 201380040804.8.
Mar. 22, 2016 Office Action issued in Korean Patent Application No. 2015-7001555.
Mar. 22, 2016 Extended European Search Report issued in European Patent Application No. 13828591.1.
Ruff et al., "Imidodisulfuryl Fluoride, Cesium Imidodisulfuryl Fluoride, and Fluoroimidodisulfuryl Fluoride," Inorganic Syntheses, vol. 11, pp. 138-140, 1968.
Berkessel et al., "Synthesis and Structural Characterization of a New Class of Strong Chiral Bronsted Acids: 1,1'-Binaphthyl-2,2'-bis(sulfuryl)imides (JINGLEs)," Eur. J. Org. Chem., pp. 5165-5170, 2010.
Beran et al., "A New Method of the Preparation of Imido-bis-(sulfuric acid) Dihalogenide, (F, Cl), and the Potassium Salt of Imido-bis(sulfuric acid) Difluoride," Z. Amorg. Allg. Chem., vol. 631, pp. 55-59, 2005.
Oct. 22, 2013 International Search Report issued in International Application No. PCT/JP2013/070029.
Oct. 10, 2015 Office Action issued in Chinese Patent Application No. 201380040804.8.

* cited by examiner

*Primary Examiner* — Wayne Langel
(74) *Attorney, Agent, or Firm* — Oliff PLC

(57) ABSTRACT

The present invention provides an industrially advantageous method for producing bis(halosulfonyl)amine that makes it possible to inhibit the rapid generation of gas and reduce the amount of halogenating agent used by controlling the reaction rate among sulfamic acid, the halogenating agent and a halosulfonic acid to nearly a constant rate from the initial stage to the final stage of the reaction. The method for producing bis(halosulfonyl)amine of the present invention allows the obtaining of a bis(halosulfonyl)amine such as N-(fluorosulfonyl)-N-(chlorosulfonyl)amine or bis(chlorosulfonyl)amine by a production method that includes heating a mixture containing sulfamic acid and a halosulfonic acid to a temperature higher than room temperature, adding a halogenating agent thereto, and allowing to react while adjusting to a prescribed temperature.

8 Claims, No Drawings

METHOD FOR PRODUCING BIS(HALOSULFONYL)AMINE

TECHNICAL FIELD

The present invention relates to a method for producing bis(halosulfonyl)amine. More particularly, the present invention relates to an industrially advantageous method for producing bis(halosulfonyl)amine that makes it possible to inhibit the rapid generation of gas and reduce the amount of halogenating agent used by controlling the reaction rate among sulfamic acid, the halogenating agent and a halosulfonic acid to nearly a constant rate from the initial stage to the final stage of the reaction.

The present application claims priority on the basis of Japanese Patent Application No. 2012-174209, filed in Japan on Aug. 6, 2012, the contents of which are incorporated herein by reference.

BACKGROUND ART

Salts of bis(fluorosulfonyl)amine are compounds that are useful in various fields such as in battery electrolytes, battery electrolyte additives or materials of electrically conductive coated films (Patent Document 1, Patent Document 2, Patent Document 3). In addition, bis(chlorosulfonyl)amine, by reacting with a fluorinating agent or by carrying out a cation exchange reaction after reacting with a fluorinating agent, can be derived to various salts of bis(fluorosulfonyl)amine, thereby making this a useful compound as well (Patent Document 4, Patent Document 5, Non-Patent Document 1).

A known method for synthesizing bis(chlorosulfonyl) amine consists of mixing sulfamic acid, thionyl chloride and chlorosulfonic acid followed by heating the mixture and allowing to react (Patent Document 3, Patent Document 4, Patent Document 6, Non-Patent Document 2, Non-Patent Document 3).

PRIOR ART DOCUMENTS

Patent Documents

Patent Document 1: Japanese Unexamined Patent Application Publication (Translation of PCT Application) No. H08-511274

Patent Document 2: Japanese Patent Application, First Publication No. 2010-121114

Patent Document 3: Japanese Patent Application, First Publication No. 2010-168249 Patent Document 4: Japanese Patent Application, First Publication No. 2010-189372

Patent Document 5: Japanese Patent Application Publication (Translation of PCT Application) No. 2004-522681

Patent Document 6: Japanese Patent Application, First Publication No. H08-217745

Non-Patent Documents

Non-Patent Document 1: Inorg. Synth., 11, 138-140 (1968)

Non-Patent Document 2: Eur. J. Org. Chem., 5165-5170 (2010)

Non-Patent Document 3: Z. Anorg. Allg. Chem., 631, 55-59 (2005)

DISCLOSURE OF THE INVENTION

Problems To Be Solved By The Invention

Heating to a temperature of 80° C. is required to complete the reaction among sulfamic acid, thionyl chloride and chlorosulfonic acid. The boiling point of thionyl chloride used as a chlorinating agent is 76° C. If the temperature of a mixture containing thionyl chloride is raised to 80° C. or higher, the thionyl chloride evaporates and is eliminated from the reaction system in the form of thionyl chloride. Consequently it is necessary to add an excess of thionyl chloride to the reaction system. Therefore, a method has been attempted that consists of lowering the temperature early in the reaction and raising the temperature late in the reaction. According to this method, although the loss of thionyl chloride is reduced, since a large amount of gas may be generated rapidly such as when switching from the initial reaction temperature to the final reaction temperature, this method was unsuitable for use as an industrial production method.

An object of the present invention is to provide an industrially advantageous method for producing bis (halosulfonyl) amine that makes it possible to inhibit rapid generation of gas and reduce the amount of halogenating agent used by controlling the reaction rate among sulfamic acid, a halogenating agent and a halosulfonic acid to nearly a constant rate from the initial stage to the final stage of the reaction.

Means for Solving the Problems

As a result of conducting extensive studies to solve the aforementioned problems, the inventors of the present invention completed the aspects of the invention as described below. Namely, the present invention includes the aspects indicated below.

(1) A method for producing bis(halosulfonyl)amine, including heating a mixture containing sulfamic acid and a halosulfonic acid to a temperature higher than room temperature followed by adding a halogenating agent thereto.

(2) The production method described in (1), wherein the temperature higher than room temperature is 50° C. to 140° C.

(3) The production method described in (1) or (2), wherein the halogenating agent is added by dividing into a plurality of additions.

(4) The production method described in any one of (1) to (3), wherein the halogenating agent is thionyl chloride.

(5) The production method described in (4), wherein 2 to 3 moles of thionyl chloride are added to 1 mole of sulfamic acid.

(6) The production method described in any one of (1) to (5), further including reacting the mixture at a temperature of 50° C. to 85° C. after adding the halogenating agent.

(7) The production method described in any one of (1) to (5), further including reacting the mixture at a temperature of 86° C. to 105° C. after adding the halogenating agent.

(8) The production method described in any one of (1) to (5), further including reacting the mixture at a temperature of 106° C. to 140° C. after adding the halogenating agent.

Effects of the Invention

Since the production method of the present invention makes it possible to inhibit the rapid generation of gas and reduce the amount of halogenating reagent used by controlling the reaction rate among sulfamic acid, the halogenating agent and a halosulfonic acid to nearly a constant rate from the initial stage to the final stage of the reaction, it is advantageous for the industrial production of bis(halosulfonyl)amine. In addition, according to the production method of the present invention, bis(halosulfonyl)amine can be produced at high yield, thereby making it advantageous for industrial production.

BEST MODE FOR CARRYING OUT THE INVENTION

The method for producing bis (halosulfonyl)amine according to one aspect of the present invention includes heating a mixture containing sulfamic acid and a halosulfonic acid to a temperature higher than room temperature following by adding a halogenating agent thereto. Furthermore, bis(halosulfonyl)amine is a compound represented by formula (3). In formula (3), X represents halogen atoms. X may be the same or different. Specific examples of bis (halosulfonyl)amines include N-(fluorosulfonyl)-N-(chlorosulfonyl)amine and bis(chlorosulfonyl)amine.

[Chemical Formula 1]

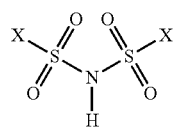

(3)

The sulfamic acid used in the present invention is a known substance represented by formula (1). A commercially available product may be used for the sulfamic acid. The sulfamic acid is preferably subjected to drying treatment prior to using in the reaction to remove water contained therein. There are no particular limitations on the method used for drying treatment, and an ordinary method such as heat drying or vacuum drying can be used.

[Chemical Formula 2]

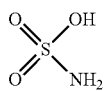

(1)

The halosulfonic acid used in the present invention is a known substance represented by formula (2). In formula (2), X represents a halogen atom. A commercially available product may be used for the halosulfonic acid. The halosulfonic acid is preferably subjected to drying treatment prior to using in the reaction to remove water contained therein. There are no particular limitations on the method used for drying treatment, and an ordinary method such as heat drying or vacuum drying can be used. The halosulfonic acid is preferably fluorosulfonic acid or chlorosulfonic acid and more preferably chlorosulfonic acid.

[Chemical Formula 3]

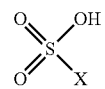

(2)

There are no particular limitations on the halogenating agent used in the present invention, and a commercially available product can be used. The halogenating agent is preferably subjected to drying treatment prior to using in the reaction to remove water contained therein. There are no particular limitations on the method used for drying treatment, and an ordinary method such as heat drying or vacuum drying can be used. Examples of halogenating agents include phosphorous trichloride, phosphorous pentachloride, thionyl chloride and thionyl fluoride. Thionyl chloride is preferable from the viewpoint of facilitating purification following completion of the reaction.

The mixture containing sulfamic acid and a halosulfonic acid is such that the molar ratio of halosulfonic acid to sulfamic acid is preferably 0.9 to 1.2 and more preferably 0.95 to 1.05.

This mixture may also contain a solvent for dissolving or dispersing the sulfamic acid and halosulfonic acid in addition to the sulfamic acid and halosulfonic acid as necessary. Although there are no particular limitations on the solvent provided it does not inhibit the reaction among the sulfamic acid, halogenating agent and halosulfonic acid, it is preferably a compound that does not have an aromatic proton.

The mixture containing sulfamic acid and halosulfonic acid is heated prior to addition of the halogenating agent. The temperature of the heated mixture when the halogenating agent is added is a temperature that is higher than room temperature, preferably 50° C. to 140° C. and more preferably 60° C. to 80° C. Adjusting to such a temperature makes it possible to prevent rapid generation of gas.

There are no particular limitations on the amount of halogenating agent added. For example, the amount of halogenating agent based on 1 mole of sulfamic acid is preferably 2 to 4 moles and more preferably 2 to 3 moles. If the added amount of halogenating agent is less than 2 moles, yield and purity tend to decrease.

Although there are no particular limitations on the manner in which the halogenating agent is added, it may be gradually added continuously, gradually added intermittently or added by dividing into a plurality of additions while providing an interval between each addition.

In the case of adding continuously or intermittently, the addition rate is preferably held to a low rate to prevent sudden increases in the reaction rate. The addition rate can be suitably set according to the size of the reactor and the set reaction temperature. In the case of adding by dividing into a plurality of additions, the amount added in a single addition is preferably held to a low amount to prevent sudden increases in the reaction rate. The amount added in a single addition can be suitably set according to the size of the reactor and the set reaction temperature.

After adding the halogenating agent, the reaction can be allowed to proceed while adjusting the temperature. The temperature of the mixture following addition of the halogenating agent can be set to various temperatures in order to control to a desired reaction rate according to the size of the reactor, and is a temperature higher than room temperature, preferably 50° C. to 140° C. and more preferably 60° C. to 80° C. In addition, the temperature of the mixture following addition of the halogenating agent can be set to, for example, 50° C. to 85° C., 86° C. to 105° C. or 106° C. to 140° C.

Although there are no particular limitations on the reaction time, it is normally 48 hours or less and preferably 24 hours or less.

The reaction can be carried out in the presence of a catalyst. A basic catalyst is preferable for the catalyst. Examples of basic catalysts include aliphatic tertiary amines such as trimethylamine, triethylamine, tripropylamine, tributylamine, tri(hydroxyethyl)amine, methylpiperidine, dimethylpiperazine or diazabicyclooctane, and trialkylphosphines such as trimethylphosphine or triethylphosphine. The amount of catalyst used is preferably 0.0001 moles to 0.1 moles based on 1 mole of sulfamic acid.

The catalyst may be added to the mixture prior to the addition or the halogenating agent, may be added simultaneous to the addition of the halogenating agent, or may be added following addition of the halogenating agent. Among these, adding to the mixture prior to addition of the halogenating agent is preferable.

The sulfamic acid, halogenating agent and halosulfonic acid appear to undergo a reaction represented by reaction scheme (A) or reaction scheme (B) according to Non-Patent Document 3.

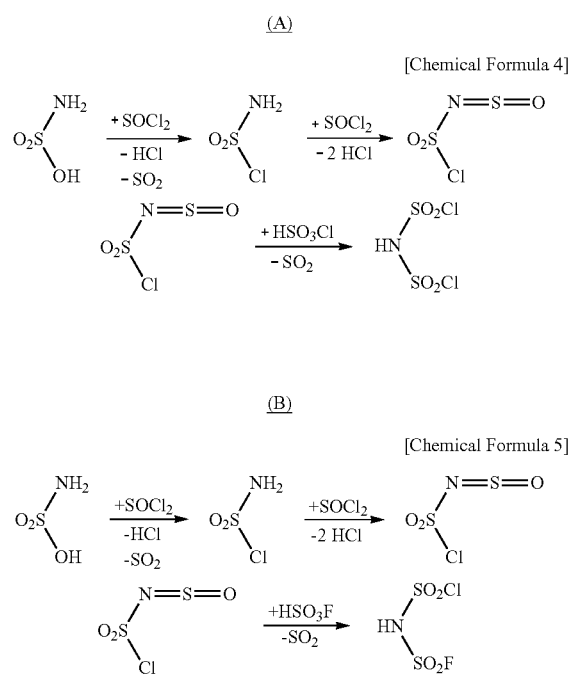

As can be understood from the reaction schemes, when 1 mole of sulfamic acid, 1 mole of halosulfonic acid and 2 moles of halogenating agent in the form of thionyl chloride react, 2 moles of sulfurous acid gas ($SO_2$) and 3 moles of hydrochloric acid gas (HCl) are formed. If the sulfamic acid, halogenating agent (thionyl chloride) and halosulfonic acid are mixed and allowed to react by heating the mixture to raise the temperature, the reaction rate becomes excessively fast and sulfurous acid gas and hydrochloric acid gas are generated rapidly, thereby resulting in problems such as the pressure of the reactor becoming excessively high.

In contrast, according to the method of the present invention, rapid generation of gas is inhibited by controlling the reaction rate among the sulfamic acid, halogenating agent and halosulfonic acid to nearly a constant rate from the initial stage to the final stage of the reaction.

EXAMPLES

The following provides a more detailed explanation of the present invention by listing examples thereof. Furthermore, the present invention is not subjected to limitation by the following examples, and can naturally be carried out by adding suitable modifications within a range that is compatible with the gist of the present invention, and all such modifications are also included within the technical scope of the present invention.

Example 1

97.1 g (1.00 mol) of sulfamic acid and 121.2 g (1.04 mol) of chlorosulfonic acid were placed in a 500 ml reaction vessel equipped with a stirrer, thermometer and reflux condenser followed by stirring to obtain a mixture. This mixture was heated to 70° C. while stirring. Next, 237.9 g (2.00 mol) of thionyl chloride were dropped therein over the course of 1 hour. The mixture was allowed to react for 6 hours at 70° C. Next, the temperature was raised to 80° C. over the course of 0.5 hours. Subsequently, 119.0 g (1.00 mol) of thionyl chloride were dropped in over the course of 1 hour. Next, the temperature was raised to 90° C. over the course of 1.9 hours followed by allowing to react for 4 hours at 90° C.

Subsequently, the temperature was raised to 130° C. and the reaction was allowed to proceed for 2 hours at 130° C. At this time, unreacted thionyl chloride evaporated and was discharged outside the system.

There was no rapid generation of gas during the aforementioned reaction.

The resulting reaction liquid was subjected to vacuum distillation. 206.6 g of a colorless, clear liquid (bis(chlorosulfonyl)amine) was obtained as the fraction obtained under conditions of 105° C. or higher and 7 torr (0.97 mol, yield based on sulfamic acid: 97%, yield based on thionyl chloride: 32%).

Example 2

268.0 g (2.76 mol) of sulfamic acid and 334.5 g (2.87 mol) of chlorosulfonic acid were placed in a 2000 ml reaction vessel equipped with a stirrer, thermometer and reflux condenser followed by stirring to obtain a mixture. This mixture was heated to 70° C. while stirring. Next, 656.7 g (5.52 mol) of thionyl chloride were dropped therein over the course of 1.5 hours. Next, the mixture was allowed to react for 6 hours at 70° C. Subsequently, 131.3 g (1.10 mol) of thionyl chloride were dropped in over the course of 0.2 hours. Next, the temperature was raised to 90° C. over the course of 3 hours followed by allowing to react for 4 hours at 90° C.

Subsequently, the temperature was raised to 130° C. and the reaction was allowed to proceed for 2 hours at 130° C. At this time, unreacted thionyl chloride evaporated and was discharged outside the system.

There was no rapid generation of gas during the aforementioned reaction.

The resulting reaction liquid was subjected to vacuum distillation. 553.6 g of a colorless, clear liquid (bis(chlorosulfonyl)amine) was obtained as the fraction obtained under conditions of 100° C. or higher and 7.5 torr (2.59 mol, yield based on sulfamic acid: 94%, yield based on thionyl chloride: 39.1%).

Comparative Example 1

9.71 g (0.10 mol) of sulfamic acid, 12.12 g (0.104 mol) of chlorosulfonic acid and 29.74 g (0.25 mol) of thionyl chloride were placed in a 500 ml reaction vessel equipped with a stirrer, thermometer and reflux condenser followed by stirring to obtain a mixture. This mixture was heated to 70° C. while stirring followed by allowed to react for 4 hours at 70° C.

The temperature was raised to 130° C. over the course of 2 hours followed by allowing to react for 2 hours at 130° C. Gas was rapidly generated during the time the temperature was raised to 130° C.

The resulting reaction liquid was subjected to vacuum distillation. 7.74 g of a colorless, clear liquid (bis(chlorosulfonyl)amine) was obtained as the fraction obtained under conditions of 110° C. or higher and 7 torr (0.036 mol, yield based on sulfamic acid: 36%, yield based on thionyl chloride: 14.4%).

On the basis of the above results, according to the method of the present invention, bis(halosulfonyl)amine was determined to be able to be produced at high yield while inhibiting rapid generation of gas. In addition, the amount of halogenating agent used relative to the yield of bis(halosulfonyl)amine was determined to be able to be reduced considerably.

INDUSTRIAL APPLICABILITY

Since the production method of the present invention makes it possible to inhibit the rapid generation of gas and reduce the amount of halogenating agent used by controlling the reaction rate among sulfamic acid, a halogenating agent and a halosulfonic acid to nearly a constant rate from the initial stage to the final stage of the reaction, it is advantageous for the industrial production of bis(halosulfonyl)amine.

The invention claimed is:
1. A method for producing bis(halosulfonyl)amine, comprising:
   heating a mixture containing sulfamic acid and a halosulfonic acid to a temperature higher than room temperature, followed by
   adding a halogenating agent to the mixture to obtain the bis(halosulfonyl)amine.
2. The production method according to claim 1, wherein the temperature higher than room temperature is 50° C. to 140° C.
3. The production method according to claim 1, wherein the halogenating agent is added by dividing into a plurality of additions.
4. The production method according to claim 1, wherein the halogenating agent is thionyl chloride.
5. The production method according to claim 4, wherein 2 to 3 moles of thionyl chloride are added to 1 mole of sulfamic acid.
6. The production method according to claim 1, further comprising reacting the mixture at a temperature of 50° C. to 85° C. after adding the halogenating agent.
7. The production method according to claim 1, further comprising reacting the mixture at a temperature of 86° C. to 105° C. after adding the halogenating agent.
8. The production method according to claim 1, further comprising reacting the mixture at a temperature of 106° C. to 140° C. after adding the halogenating agent.

* * * * *